Oct. 1, 1968  J. F. ELLIOTT  3,403,558
PIEZORESISTIVE THERMOMETER
Filed April 7, 1966
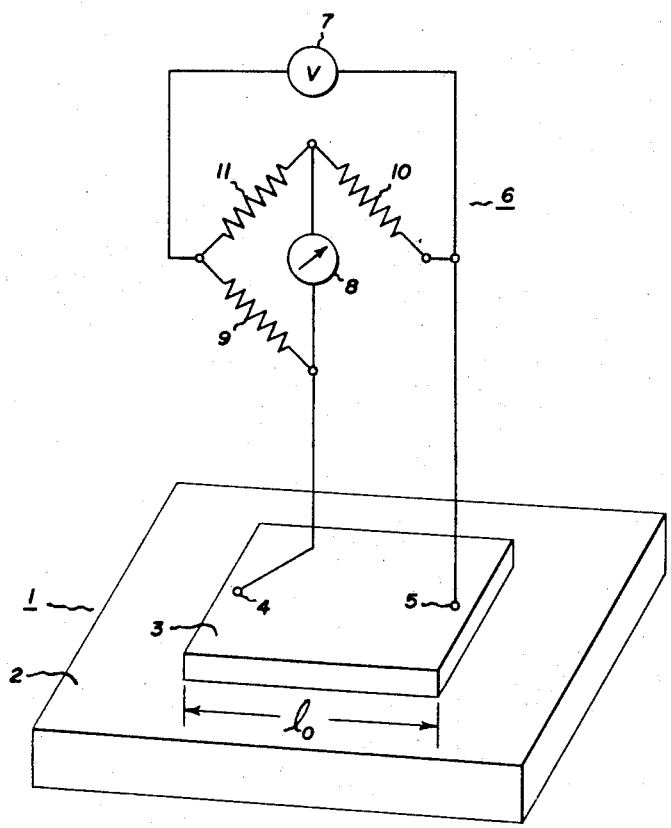
INVENTOR:
JAMES F. ELLIOTT,
BY *Urban H. Faubion*
HIS ATTORNEY.

United States Patent Office 3,403,558
Patented Oct. 1, 1968

3,403,558
PIEZORESISTIVE THERMOMETER
James F. Elliott, Syracuse, N.Y., assignor to General Electric Company, a corporation of New York
Filed Apr. 7, 1966, Ser. No. 541,001
2 Claims. (Cl. 73—362)

ABSTRACT OF THE DISCLOSURE

A piezoresistive thermometer having a member of piezoresistive material bonded to a second member of a material having a different coefficient of thermal expansion than the piezoresistive member. Thus both members expand at different rates due to changes in temperature, to produce a mechanical strain in the piezoresistive member thereby causing its resistance to change. An electrical supply is connected to an electrical indicating network which is connected to the piezoresistive member so that these resistance changes result in a voltage indication of temperature.

---

This invention relates to an improved thermometer and more specifically to a thermometer which utilizes the large piezoresistive properties of a semiconductor material.

Briefly, a highly sensitive temperature measuring device which produces an electrical output is obtained by placing together two materials which exhibit different coefficients of linear thermal expansion. The material with the lower coefficient of expansion is chosen to be a piezoresistive material and is fabricated to have a smaller cross-sectional area than the other material. The two materials are bonded together in a manner well kown to those skilled in the art such that when the two expand at different rates due to changes in temperature, a mechanical strain is produced in the piezoresistive material thereby causing its resistance to change. The piezoresistive material is placed in an electrical indicating network and an electrical supply is provided so that changes in resistance of the piezoresistive material result in a voltage indication of temperature. The sensitivity of such a thermometer, i.e., the change in voltage per unit change in temperature, is experienced to be relatively high as compared to other temperature measuring devices.

The novel features which are believed to be characteristic of the invention are distinctly pointed out in the appended claims. The invention itself, however, both as to its organization and method of operation, together with further objects and advantages thereof may best be understood by reference to the following description taken in connection with the accompanying drawing in which:

FIGURE 1 shows a thermometer constructed according to the present invention and includes both a perspective view of the temperature sensing element and a schematic of associated circuitry.

Referring now to the figure, there is shown a temperature sensing element or thermometer 1 which is placed in the environment where the temperature is to be measured. The operation of the device depends upon the production of stress in a piezoresistive material 3 (e.g., silicon, germanium) by a material 2 which has a different coefficient of thermal expansion when the temperature of the thermometer 1 is changed. As a practical matter where silicon or germanium constitute the piezoresistive material 3, the other material selected generally has a high coefficient of thermal expansion as compared to the piezoresistive material. As illustrated here, the material 2 having the high coefficient of thermal expansion is used as a support block for the piezoresistive material 3 since the piezoresistive materials generally are somewhat fragile. Thus, the support material or block 2 is a substantially rectangular plate on which the piezoresistive material of essentially the same shape but smaller cross-sectional (i.e. perpendicular to the line of elongation) area is mounted.

In order to measure the changes in resistance of the piezoresistive material 3, which are responsive to changes in temperature, the piezoresistive material 3 is connected with output leads 4 and 5 leading to a Wheatstone electrical bridge indicating network 6 including a voltage source 7 connected to the input of the Wheatstone bridge and an indicating meter 8 connected across the output terminals of the bridge. The bridge 6 includes in adition to the piezoresistive material 3 in one leg thereof, a pair of adjacent legs comprising resistors 9 and 10 and an opposite leg comprising resistor 11. In the configuration shown in FIGURE 1, or one substantially similar to this configuration, applicant has found that by the utilization of a piezoresistive material 3 of relatively low coefficient of thermal expansion a thermometer of increased sensitivity is produced.

The materials 2 and 3 of the temperature sensing element 1 have a common length $l_0$ in a bonded arrangement which is subjected to the same temperature variations $\Delta T$. In this configuration, any change in temperature of the bonded arrangement causes a change in length 1 which is equal to the length $l_0$ times the difference in coefficients of linear expansion of the two materials times the change in temperature. In mathematical symbols this equation can be written:

$$\Delta l = l_0(a_2 - a_1)\Delta T \qquad (1)$$

where $a_1$ equals the coefficient of linear expansion of the piezoresistive material 3 and $a_2$ equals the coefficient of linear thermal expansion of the non-piezoresistive material 2.

Since the materials 2 and 3 have different cross-sectional areas, as is evident in FIGURE 1, for changes in length due to changes in temperature the piezoresistive material 3, which has the smaller cross-sectional area, is strained by an amount ($\epsilon$). In mathematical symbols this is:

$$\epsilon = \frac{\Delta l}{l_0} = (a_2 - a_1)\Delta T \qquad (2)$$

Since the material 3 is piezoresistive, the resistance R of this material will vary in proportion to $\epsilon$, and thus to a temperature change $\Delta T$. Mathematically speaking this is:

$$\frac{\Delta R}{R} = \epsilon G = G(a_2 - a_1)\Delta T \qquad (3)$$

where R equals the original resistance of the piezoresistive material and G equals the gage factor of the piezoresistive material.

By putting the piezoresistive material 3 in one arm of a Wheatstone bridge network 6, to which is supplied a voltage V, the change in voltage across the piezoresistive arm is equal to:

$$\Delta V = \frac{V}{2R} \Delta R \frac{V}{2} = G(a_2 - a_1)\Delta T \qquad (4)$$

In a specific embodiment the piezoresistive material is silicon which has a coefficient of linear thermal expansion, $a_1$, approximately equal to $3 \times 10^{-6}$ per degree centigrade. The support material 2 is steel with an $a_2$ approximately equal to 13.9 $10^{-6}$ per degrees centigrade. Other materials with a similarly high coefficient of linear thermal expansion as compared to that of the piezoresistive material may be chosen. For example, other materials which may be used are aluminum or magnesium which have an $a_2$ of $28 \times 10^{-6}$ per degree centigrade. The term $(a_2 - a_1)$ in the above equation, after substituting the actual values is approximately equal to somewhere between 10 and $25 \times 10^{-6}$ per degrees centigrade. Since the gage factor for silicon is on the order of 100, the change in voltage per degree change in temperature is approximately equal to $$\frac{V}{2} \times 100 \times 10 \times 10^{-6} \qquad (5)$$

which is approximately equal to $5V \times 10^{-4}$ volts per degree centigrade. For simplicity sake a Wheatstone bridge voltage V of approximately one volt may be used as exemplary which resolves the above equation down to .500 microvolt per degree centigrade. This sensitivity is approximately ten times that of the sensitivity of a common thermocouple element. In addition, the change in voltage which will be indicated in the meter 8 is a linear function of the change in temperature, as shown in Equation 4, which makes for very convenient utilization of the output signal.

Other advantages of the described invention will be apparent to those skilled in the art. For example, by utilizing piezoresistive material, it can be seen that the temperature sensing element can be made very small, for example on the order of $10^{-4}$ cubic centimeters. Also, the leg 9 of the Wheatstone bridge adjacent to the sensitive leg can be placed in the same environment as the sensing leg so as to compensate for errors due to any temperature dependence of zero stress resistivity of the piezoresistive material. Finally, the utilization of such piezoresistive materials as silicon allow temperature sensing over a very large range, theoretically from zero degrees Kelvin to the melting point of silicon which is approximately 1400° C.

Although these objects and advantages of the invention have been described with respect to FIGURE 1, other modifications of the invention will likewise be obvious to those skilled in the art; thus, applicant does not wish to be limited to this arrangement but rather should be given the full benefit of the spirit and scope of the appended claims.

What I claim as new and desire to secure by Letters Patent of the United States is:

1. A method of measuring temperature comprising exposing to the temperature to be measured a body comprising the steps of:
   (a) joining a first member of piezoresistive material to a second member of a material having a different coefficient of linear thermal expansion than said first member and a larger cross-sectional area than first member in a plane normal to the direction of thermally responsive elongation of said first member, so that any temperature differential to which the said body is subjected produces both a mechanical strain and a temperature-responsive change in electrical resistivity in said first member thereby causing the resistance of said first member to change;
   (b) connecting said first member to an indicating circuit in circuit relation with a voltage source and an indicating meter;
   (c) passing a current from said voltage source through said first member thereby producing a first voltage signal which varies in proportion to said change of resistance of said first member;
   (d) passing said current through a compensating means having the same change in resistance due to temperature responsive properties as said first member thereby producing a second signal voltage which varies in equal proportion to that part of said first signal voltage due to said change in electrical resistivity of said first member;
   (e) connecting said first member in circuit relation with said compensating means so that said second signal voltage is subtracted from said first signal voltage thereby producing a corrected signal voltage; and
   (f) applying said corrected signal voltage to said indicating meter, to measure said corrected signal voltage as a voltage indication of temperature.

2. A method of measuring temperature comprising exposing to the temperature to be measured a body comprising the steps of:
   (a) joining a first member of piezoresistive material to a second member of a material having a different coefficient of linear thermal expansion than said first member and a larger cross-sectional area than first member in a plane normal to the direction of thermally responsive elongation of said first member, so that any temperaturer differential to which said body is subjected produces both a mechanical strain and a temperature-responsive change in electrical resistivity in said first member thereby causing the resistance of said first member to change;
   (b) connecting said first member as a leg of a Wheatstone bridge that is part of a circuit including a voltage source and a voltage meter connected across the output terminals of said Wheatstone bridge so that a current from said voltage source passes through said first member thereby producing a first signal voltage which varies in proportion to said change of resistance;
   (c) correcting said first voltage signal to compensate for that portion of said change of resistance due to said change of electrical resisitivity by placing a compensating member having the same said temperature-responsive change in electrical resistivity as said first member in an adjacent leg of said Wheatstone bridge so that said current continues through said adjacent leg and produces a second signal voltage which varies in equal proportion to that part of said first signal voltage due to said change in electrical resistivity of said first member while at the same time subtracting said second signal voltage from said first signal voltage thereby producing a corrected signal voltage;
   (d) applying said corrected signal voltage to said voltage meter to measure said corrected signal voltage as a voltage indication of temperature.

References Cited

UNITED STATES PATENTS

| | | |
|---|---|---|
| 1,000,146 | 8/1911 | Bristol _____ 338—25 |
| 2,166,935 | 7/1939 | Adams. |
| 2,258,958 | 10/1941 | Pearson _____ 338—25 |
| 2,322,319 | 6/1943 | Ruge _____ 338—2 XR |
| 2,395,192 | 2/1946 | Ostergren. |
| 2,990,529 | 6/1961 | Courtney-Pratt _____ 338—25 |
| 2,344,642 | 3/1944 | Ruge _____ 338—3 |

S. CLEMENT SWISHER, *Primary Examiner.*

F. SHOON, *Assistant Examiner.*